Oct. 18, 1927.
H. BROWN
1,645,790
PACKLESS BALL VALVE
Filed Aug. 19 1926
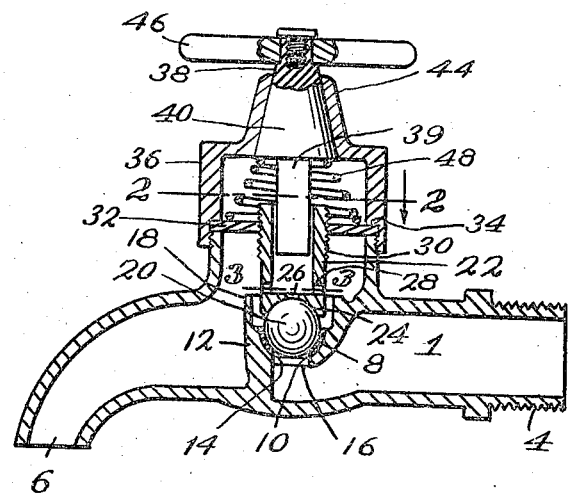
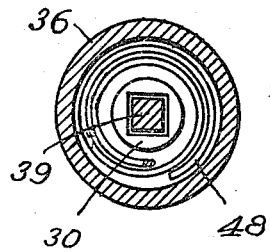
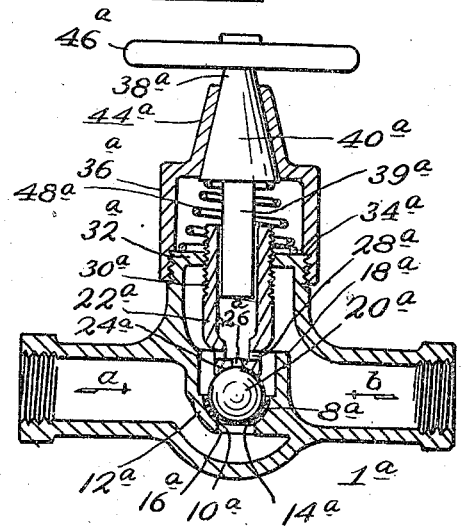
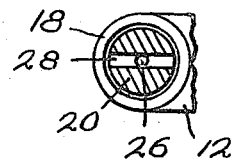
Inventor:
Harold Brown,
By F. G. Fischer,
Attorney.
Witness:
Fred C. Fischer.

Patented Oct. 18, 1927.

1,645,790

UNITED STATES PATENT OFFICE.

HAROLD BROWN, OF KANSAS CITY, KANSAS.

PACKLESS BALL VALVE.

Application filed August 19, 1926. Serial No. 130,190.

My invention relates to valves, and one object is to provide a valve which is so constructed that the usual packing used around the valve stem to avoid leakage can be dispensed with.

A further object is to provide a valve which will serve both as a manually controlled feed valve and as a check valve.

Another object is to provide a valve of but few parts which can be economically manufactured and assembled and are not likely to get out of order.

Other objects will hereinafter appear and in order that the invention may be fully understood, reference will now be had to the accompanying drawing, in which:

Fig. 1 is a vertical longitudinal section of of the valve arranged in the form of a faucet.

Fig. 2 is a broken cross section on line 2—2 of Fig. 1.

Fig. 3 is a fragmentary section on line 3—3 of Fig. 1.

Fig. 4 is a vertical longitudinal section of the valve arranged in the form of a feed and check valve.

Referring more particularly to the form disclosed by Figs. 1 to 3, inclusive, 1 designates a valve casing having threads 4 at one end and a discharge nozzle 6 at its opposite end. The casing 1 is provided intermediate its ends with a seat 8 formed in a bushing 10 arranged in a partition 12 preferably cast integral with the casing 1. The bushing 10 and the partition 12 have registering ports 14 and 16, respectively, for the passage of a fluid through the valve and said partition 12 has an upwardly projecting tubular extension 18 for a purpose which will hereinafter appear.

20 designates a ball valve-plug arranged to snugly fit the seat 8 in the bushing 10. Said valve-plug 20 is normally held in seated position by a tubular element 22 provided at its closed lower end with a socket 24 adapted to fit snugly upon the valve-plug 20. The lower closed end of the tubular element 22 has a centrally disposed vertical relief port 26 and traverse relief ports 28, all of which extend from the exterior to the interior portion of said element 22 as shown by Fig. 1. The tubular element 22 is provided at its upper portion with external screw threads 30 for engagement with corresponding internal screw threads in a partition 32 secured upon the casing 1 by the internal annular shoulder 34 of a cap 36, which is threaded upon the upper portion of the valve casing 1.

38 designates a valve stem having a lower portion 39, which extends into the tubular element 22, and a conical upper portion 40 which is journaled in the upwardly tapered portion 44 of the cap 36. The lower portion 39 is rectangular in cross section to fit into the corresponding bore of the tubular element 22, see Fig. 2, so that when the valve stem 38 is rotated it will also rotate the tubular element 22 to open and close the valve.

The upper end of the valve stem 38 projects through the upper end of the cap 36 and is provided with a suitable handle 46 whereby said valve stem may be rotated.

A coil spring 48 is interposed between the partition 32 and the conical upper portion 40 of the valve stem 38 and exerts an upward pressure on said valve stem to hold the conical portion 40 snugly in the tapered portion 44 of the cap 36.

In order to open the valve for the passage of fluid, such for instance as steam or water, the handle 46 is turned in the proper direction to screw the tubular element 22 upwardly in the partition 32, whereupon the valve-plug 20 becomes unseated by pressure of the fluid beneath said valve-plug. Any air or fluid which may pass between the valve-plug 20 and the socket 24 is free to escape through the relief ports 26 and 28 and thereby permit the valve-plug 20 to come in direct contact with said socket 24 where it is frictionally held against rotation by the upward pressure of the fluid passing through the ports 14 and 16. The escape of any fluid from between the valve plug 20 and the socket 24 through the ports 26 and 28 is hastened by the suction of the fluid directed upwardly by the tubular extension 18 which surrounds the valve plug 20 and the lower end of the tubular element 22. As a ground joint is provided between the upper conical portion 40 of the valve stem 30 and the tapered portion 44 of the cap 36 no leakage of fluid through the top of the valve can occur as in the case of ordinary packing, and wear on said ground joint is automatically taken up by the upward pressure of the spring 48. In order to close the valve and cause the valve-plug 20 to engage the seat 8, the handle 46 is rotated in a reverse direction to that at which it was rotated to open the valve.

The construction and operation of the valve disclosed by Fig. 4 is similar to that of the valve disclosed by Fig. 1, as it evidenced by corresponding reference numerals with exponents "a," the main difference being that when the modified form of valve is opened to permit fluid to pass in the direction of arrow $a$, any reversal of the fluid in the direction of the arrow $b$ will instantly cause the valve-plug $20^a$ to engage the seat $8^a$ and thus prevent the fluid from flowing backwardly through the valve.

In addition to the forms disclosed by the drawing, I reserve all rights to such other forms and modifications as properly fall within the spirit and scope of the invention as claimed.

Having thus described my invention, what I claim and desire to secure by Letters Patent, is:

1. A valve consisting of a casing having a port, a ball valve-plug for closing said port, a tubular element for engaging said valve-plug and provided with relief ports one of which is adjacent to the valve plug, and means for actuating said tubular element to cause the latter to control the movement of the valve plug and the opening and closing of said port.

2. A valve consisting of a casing having a port, a ball valve-plug for closing said port, a tubular element for engaging said valve plug and provided with relief ports one of which is adjacent to the valve plug, a tubular extension in the valve casing surrounding one end of said tubular element, and means for actuating said tubular element to cause the latter to control the movement of the valve-plug and the opening and closing of said port.

3. A valve consisting of a casing having a port, a ball valve-plug for closing said port, a tubular element having a socket at one end to fit over the valve-plug and provided with relief ports, one of which communicates with said socket, a partition in the valve casing and in which said tubular element is threaded, and a valve stem journaled in the valve casing and projecting into the tubular element to rotate the latter and cause it to control the movement of the valve-plug and the opening and closing of said port.

4. In a valve of the character described, a casing having a port for the passage of fluid, a ball valve plug for closing said port, and adjustable means for controlling said valve plug provided with relief means for the escape of fluid from between the valve plug and said adjustable means, and a tubular extension in the valve casing surrounding the valve plug and the adjacent end of said adjustable means.

In testimony whereof I affix my signature.

HAROLD BROWN.